TRANSISTOR CIRCUIT

Filed Feb. 2, 1955 2 Sheets-Sheet 1

INVENTORS
WILLIAM E. BRADLEY
MORRIS RUBINOFF
BY
ATTORNEY

TRANSISTOR CIRCUIT

Filed Feb. 2, 1955

INVENTORS
WILLIAM E. BRADLEY
MORRIS RUBINOFF
BY
Allen V. Hazeltine
ATTORNEY

United States Patent Office 2,973,437
Patented Feb. 28, 1961

2,973,437

TRANSISTOR CIRCUIT

William E. Bradley, Clifton Heights, and Morris Rubinoff, Sharon Hill, Pa., assignors to Philco Corporation, Philadelphia, Pa., a corporation of Pennsylvania Filed Feb. 2, 1955, Ser. No. 485,661

12 Claims. (Cl. 307—88.5)

This invention relates to circuits using semiconductive devices, and particularly to transistor circuits for signal comparison and/or combination.

For many purposes it is desirable in electrical circuits to combine or compare the effects of two or more separate signals. For example, it may be desired to combine a plurality of separate signals in such a way that the resultant signal possesses identifiable characteristics when the separate signals bear a predetermined relationship each to the other. A typical application of such circuits is to the logical elements of digital computers, for example in a so-called "AND" gate whose function is to provide an output signal in a predetermined range when, and only when, all of the input signals possess the selected characteristic simultaneously. This same circuit obviously also provides an indication of when one or more of the input signals does not possess the selected characteristics. In such circuits, it is also generally highly desirable to be able to effect the desired comparison without imposing more than the minimum of limiting conditions upon the frequency, form and direct-current level of the signals to be compared.

Circuits providing the above-outlined operation have been provided to a limited extent in the past by circuits utilizing vacuum tubes, gas tubes or relay devices. Relay devices are inherently limited, in their applications to high speed circuitry, because of their mechanical inertia, and for such high speed applications purely electronic devices appear to be necessary. While tubes have been utilized in circuits of this general class in high-speed computers, the inherent characteristics of tubes have been found to impose undesirably limiting conditions upon the nature and levels of the signals applied thereto for comparison purposes, and, in addition, the tube possesses certain other inherent drawbacks such as its requirement of relatively high operating voltages, its characteristic fragility and short life, as well as its usual requirement of filament power which is particularly disadvantageous in large-scale computers requiring great numbers of elements.

Accordingly, it is an object of our invention to provide improved circuits for the comparison and/or combination of electrical signals.

Another object is to provide circuits for comparing electrical signals, which are operative over a wide range of variations in the form and/or D.C.-level of the signals supplied thereto.

Another object is to provide an electrical circuit which produces an output signal within a first range when a predetermined group of separate input signals are applied thereto, and produces an output signal within a second range when a different group of separate input signals are applied thereto.

It is another object to provide an improved circuit for detecting the simultaneous occurrence of a predetermined characteristic in a plurality of electrical signals.

A further object is to provide electrical circuits for detecting the simultaneous occurrence of a plurality of separate pulse signals applied thereto.

A still further object is to provide circuits of the above-described general class in which the signals to be compared may comprise similar amplitude variations with respect to a common potential.

It is also an object to provide an improved "AND" gate particularly adapted for computer use, and for combination with other logical circuit elements of computers.

Another object is to provide a novel transistor switching circuit suitable for use in any of a large number of applications.

In accordance with the invention in one aspect, the above objectives are achieved by utilizing a transistor having its emitter-to-collector current path in series with that of a second transistor. A source of potential is connected in parallel with the series combination of the two transistors in such manner as to tend to produce electric current therethrough in series, and suitable means for detecting the passage of current through both transistors is normally provided. The signals to be compared or combined are then applied to the base elements of the two transistors.

When signals are applied to either one of the two transistors alone, no substantial current flows through the series path. However, when both are actuated simultaneously a relatively large current is produced, providing an indication of the simultaneous occurrence of the signals. It is one feature of our invention that the actuating signals applied to the two control elements of the two transistors may be substantially identical in form and D.C.-level. For this reason the device may be actuated from substantially identical actuating circuits utilizing the same supply potentials, without requiring special biasing means.

For example, in a preferred embodiment of the invention utilizing at least a pair of transistors having their emitter-to-collector current paths in series and a load device such as a resistor connected in series with the transistors, the base of each transistor may be actuated from the collector of another transistor directly-coupled thereto, and the same supply potential may be utilized not only for the several actuating transistors but for the series-disposed transistors in the gate circuit itself. With this circuit arrangement, one or more of the series transistors normally operates with its collector biased in the direction of forward bias with respect to its base, and it is largely because this type of operation is possible that an output voltage may be derived from the series combination of transistors which is suitable for application to the bases of other transistors operating at similar voltage levels.

More particularly, while it might be expected that to operate a transistor with its base biased further in the forward direction with respect to emitter than the collector of the same transistor would result in a diversion of most of the transistor current to the base rather than to the collector, this has been found not to be the case. The transistors of our series arrangement are therefore capable of providing the desired emitter-to-collector current indicative of simultaneous occurrence of input signals, even though their base voltages may differ from their emitter voltages at least as much as the collector voltages thereof differ from their respective emitter voltages, and in the same direction. The series-arranged transistor circuit decribed above is therefore particularly adapted to supply, and to be supplied from, circuits directly coupled thereto and utilizing supply potentials of substantially the same values. The simplification of circuitry and reduction in component complement effected by utilizing this arrangement has been found to be of great practical advantage, particularly for digital computer use.

Our series arrangement of base-controlled transistors is not limited to utilization by itself as a single gate, but may be combined in many ways as the logical requirements of the circuit may require. For example, chains of series-connected transistors may be combined in parallel, with different numbers of transistors in different chains if so desired; parallel arrangements of such chains may in turn be connected in series with other transistor circuits, or bridging transistors may be coupled between various points in different parallel chains. Each of the transistors so employed may be actuated from its conductive to its non-conductive state by signals applied to the base element thereof, and may be used as an extremely convenient electronic switching element for general switching purposes.

Other objects and features of the invention will be understood from a consideration of the following detailed description, taken in connection with the accompanying figures, in which.

Figure 1:
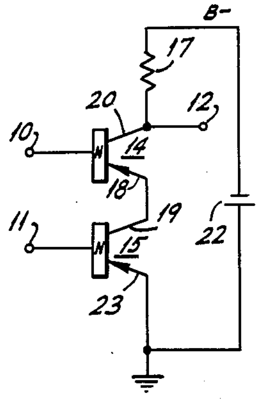
Figure 1 is a schematic diagram of a simplified circuit embodying the invention.

Referring now to Figure 1 in more detail, the simple circuit shown therein represents a basic combining or comparison circuit in accordance with the invention. In this representation, the sources of the signals applied to input terminals 10 and 11 and the signal utilization means supplied from output terminal 12 have been omitted from the drawing in the interests of clarity of exposition; particular circuits suitable for connection to the input and output terminals of Figure 1 are shown in detail in Figure 2 and will be discussed in connection therewith.

In Figure 1, transistor 14 is connected with its emitter-to-collector current path in series with that of transistor 15, and also in series with an output load resistor 17. That is, the emitter 18 of transistor 14 is directly connected to the collector 19 of transistor 15, while the collector 20 of transistor 14 is directly connected to the load resistor 17 as shown. A source of potential difference 22 applies a voltage between the emitter 23 of transistor 15 and the terminal of resistor 17 remote from collector 20. In the present example in which transistors 14 and 15 are of the type having an N-type base region, the potential source 22 is arranged with its negative terminal connected to resistor 17, and for convenience in description the positive terminal has been indicated as grounded.

The general operation of the simplified circuit shown in Figure 1 is then as follows. Little or no current flows when input terminals 10 and 11 are isolated or "floating" in potential, and the potential at output terminal 12 is substantially equal to the voltage $B^-$ supplied by source 22. Similarly, when the potentials applied to input terminals 10 and 11 are equal to or greater than ground potential, no substantial current flows in either transistor and the output potential remains the same.

When the potential applied to input terminal 11 is made substantially more negative with respect to ground than about a few hundredths of a volt, a relatively large emitter-to-base current flows in transistor 15. However, since transistor 14 is still non-conductive, no collector current flows through the emitter-to-collector paths of either transistor 14 or 15, or through load resistor 17. Similarly, if the input voltage at terminal 11 is positive or substantially at ground potential, while the voltage at terminal 10 is made substantially negative with respect to ground, no appreciable current will flow in either transistor since the emitter of transistor 14 is, in effect, isolated from ground by transistor 15, unless the potential at terminal 10 is made so far negative as to become substantially more negative than the supply potential $B^-$, in which case current will flow through load resistor 17 and an output voltage change will occur at terminal 12. In the latter condition, the output voltage at terminal 12 changes in the negative direction, and such operation is therefore useful in some applications in which it is desired to provide three states of output voltage—one substantially at $B^-$, one positive with respect to $B^-$ and one negative with respect to $B^-$. However, in the circuits to be described herein the negative voltage applied to terminal 10 or its equivalent is normally constrained in such manner that the latter extreme condition cannot occur. Therefore, when the potential at either of the terminals 10 or 11 is made substantially negative with respect to ground, while the other of these terminals is near or above ground potential, no output signal appears at terminal 12.

However, when the potentials applied to input terminals 10 and 11 are both substantially negative with respect to ground, both transistors 14 and 15 are rendered conductive and the series circuit required to supply current through each of them is completed. As a result, a relatively large current flows through load resistor 17, producing a large change in output voltage at terminal 12. Under these conditions, base current flows in both transistors 14 and 15, and the collector current of transistor 15 is the sum of the base and collector currents of transistor 14. The current through the lower transistor is therefore heavier than that through the upper transistor, and lower transistor 15 thus ordinarily will require larger base currents in operation than does the upper transistor 14, or a higher value of current-gain.

It is one feature of the invention that the actuating signals applied to input terminals 10 and 11 may be substantially identical, including both their A.C. and D.C. components. As will become apparent in the discussion of Figure 2, when both transistors are rendered conductive by the application of such substantially identical signals, the base of the lower transistor 15 will be more negative than the collector 19 thereof. Nevertheless, current will flow from emitter to collector of transistor 15, rather than being diverted or absorbed by the base element thereof, so as to provide the series current required to produce voltage changes across load resistor 17. The usefulness of this operating characteristic of the transistor and the resultant mode of operation thereof will become apparent from a consideration of Figure 2.

Figure 2:
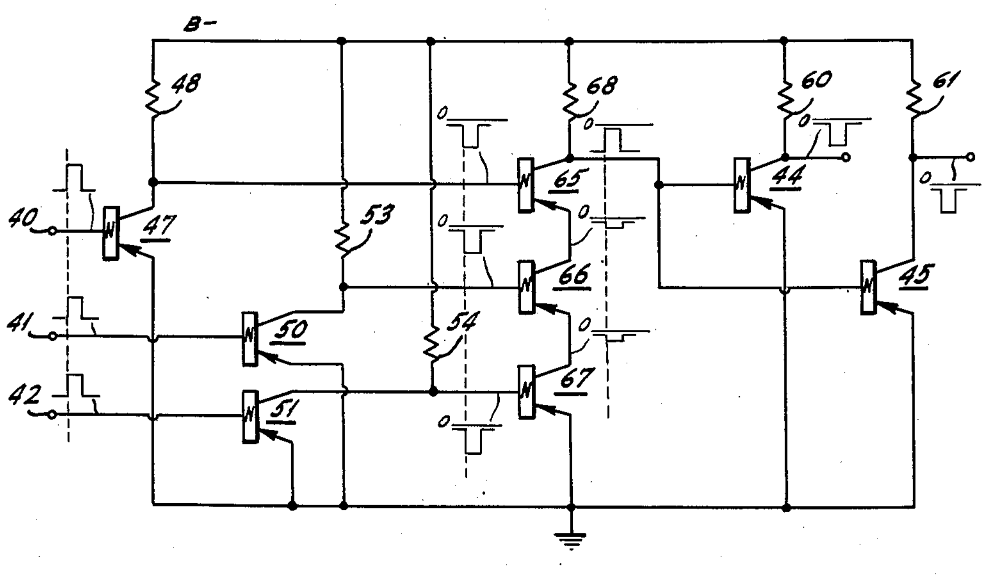
Figure 2 is a schematic diagram of a preferred embodiment of the invention in one application thereof.

In Figure 2 there is shown a group of three input terminals 40, 41 and 42 to which separate signals are to be applied. In a typical application of the invention, the signals applied to the input terminals may in each case comprise a variation of the applied voltage between a more negative and a more positive value, as is commonly the case in binary digital computer circuits for example. Also shown are a group of transistors 44 and 45 which in this example are to be rendered non-conductive when, and only when, the input signals applied to terminals 40, 41 and 42 simultaneously possess their more positive value.

In the present example, input terminal 40 is directly connected to the base element of a transistor 47, in which the emitter is grounded and the collector is connected through a load resistor 48 to a source of negative potential designated $B^-$. Here and throughout the present example it will be assumed for convenience that each of the transistors is of the type having an N-type base region. Accordingly, transistor 47 will tend to conduct most heavily when the input voltage at terminal 40 is at its more negative value, and will be substantially cut off when the input signal thereto is at its more positive value. Similarly, input terminals 41 and 42 are connected to the base elements of transistors 50 and 51, each of which may be substantially identical with transistor 47 and connected in a substantially identical circuit, the collector load resistors for transistors 50 and 51 being designated by the numerals 53 and 54, respectively.

These transistors also are then substantially cut off when the signals applied to the corresponding input terminals 41 and 42 have their more positive values.

The transistors 44 and 45, which are to be rendered substantially non-conductive when, and only when, all of transistors 47, 50 and 51 are simultaneously non-conductive, are each arranged with their emitters connected to ground, their collectors connected to $B^-$ through load resistors 60 and 61, respectively, while their base elements are directly connected together.

The circuit arrangement in accordance with the invention for rendering transistors 44 and 45 non-conductive when transistors 47, 50 and 51 are non-conductive, and only at such times, then comprises the group of three transistors 65, 66 and 67 connected with their emitter-to-collector current paths in series with each other and with a common load resistor 68, this chain of three transistors and associated load resistor in turn being connected between $B^-$ and ground. The collectors of transistors 47, 50 and 51 are directly connected to the bases of transistors 65, 66 and 67, respectively, and the collector of the upper transistor 65 is directly connected to the bases of transistors 44 and 45.

To explain the operation of the circuit arrangement of Figure 2, it will first be assumed that each of transistors 47, 50 and 51 is in its highly-conductive condition by virtue of the application to the respective bases thereof of signals having a relatively negative value, i.e. substantially negative with respect to ground in this example. In this condition, the collector of each of transistors 47, 50 and 51, and hence the base of each of transistors 65, 66 and 67 is substantially at ground potential, each of the transistors 65, 66 and 67 is thereby substantially cut off, and the current through resistors 48, 53 and 54 flows substantially entirely through the collector-to-emitter paths of the transistors 47, 50 and 51 respectively. Since each of transistors 65, 66 and 67 is substantially completely cut off, the voltage at the collector of transistor 65 rises toward $B^-$, and the bases of parallelly-arranged transistors 44 and 45 become sufficiently negative to provide strong conduction therein. Current then flows from $B^-$, through resistors 68 and the bases of transistors 44 and 45 in parallel, to ground. Since transistors 44 and 45 are in their relatively conductive condition, the voltages at the respective collectors thereof are substantially at ground potential.

If the input signal at input terminal 42 assumes its more positive value, e.g. substantially ground potential, the transistor 51 is substantially cut off and current then flow from $B^-$ through resistor 54 and the base-to-emitter current path of transistor 67 to ground, and only to a very small extent by way of the collector-to-emitter path of transistor 51. However, since transistors 65 and 66 are in their relatively non-conductive conditions, no appreciable increase in the current through the series arrangement of transistors 65, 66 and 67 occurs, and no change in the potential at the bases of transistors 44 and 45 occurs. Similarly, if the potential applied to input terminals 40 or 41 is increased to its relatively positive value, the result is merely to place the emitter-to-base elements of the corresponding transistor of the series comprising 65, 66 and 67 in a biased state which would permit conduction through the emitter-to-collector path thereof if the remainder of the series circuit were closed. Furthermore, conduction in only two of the transistors 65, 66 and 67, produced in response to the application of relatively positive signals to the corresponding pairs of the terminals 40, 41 and 42, is insufficient to provide a low-impedance path from the collector of transistor 65 to ground such that a substantial current can flow through the series-connected emitter-to-collector paths of these transistors.

However, when the signals applied to all of input terminals 40, 41 and 42 are in their relatively more positive conditions, all three of transistors 47, 50 and 51 are substantially cut off, and all of transistors 65, 66 and 67 are in their conductive conditions and provided with complete circuits for their base-to-emitter and collector-to-emitter currents. Accordingly, heavy conduction occurs through the collector-to-emitter current paths of transistors 65, 66 and 67 and load resistor 68, and the collector voltage of transistor 65 is thereby increased sufficiently to nearly cut off transistors 44 and 45, and to increase the respective collector voltages thereof substantially to $B^-$, as desired.

In the interest of complete definiteness, the following specific examples of appropriate circuit values and operating conditions are provided. Each of the transistors in Figure 2, may comprise a surface-barrier transistor of the general type described in detail in the copending application Serial No. 472,826 of R. A. Williams and J. W. Tiley entitled "Electrical Device," and filed December 3, 1954. For example, the transistor may comprise a body of N-type semiconductive material having a resistivity of the order of 1 ohm-centimeter and a hole-lifetime of the order of tens of microseconds, provided with a thin region having a thickness of about 0.2 mil, a surface-barrier emitter contact of indium in the form of a circle of diameter of about 5 mils on one side of the thin region, and a collector of the same form having a diameter of about 7 mils on the directly opposite surface of the thin region of semiconductor. Transistors 65, 66 and 67 in one typical embodiment were characterized by current gains of 0.945, 0.946 and 0.938, and by collector-resistance values of 177,000 ohms, 625,000 ohms and 709,000 ohms, respectively. Each resistor shown in Figure 2 may have a value of 1,100 ohms, and the supply voltage $B^-$ may be −1.56 volts. The input signals applied to input terminals 40, 41 and 42 may typically have, as their more negative value, a voltage of −0.43 volt and, for their more positive value, −0.02 volt. Such values of input signal voltage will be obtained, for example, when the transistors 47, 50 and 51 each comprise one half of a multivibrator of the type described in the copending application Serial No. 482,344 of Ralph B. Brown for "Electrical System" filed January 17, 1955, particularly as shown in Figure 1 thereof.

Under the foregoing conditions, the collector and base voltages of transistors 65, 66 and 67 for various combinations of the input voltages are shown in Table I.

*Table I*

| Input Terminal | | | Negative Voltages of Series-Connected Transistors | | | | | | Output Voltages | |
|---|---|---|---|---|---|---|---|---|---|---|
| 40 | 41 | 42 | $V_{C65}$ | $V_{B65}$ | $V_{C66}$ | $V_{B66}$ | $V_{C67}$ | $V_{B67}$ | $V_{C44}$ | $V_{C45}$ |
| + | + | + | 0.08 | 0.37 | 0.06 | 0.36 | 0.03 | 0.37 | 1.53 | 1.53 |
| − | + | + | 0.32 | 0.02 | 0.02 | 0.34 | 0.01 | 0.36 | 0.02 | 0.02 |
| − | − | + | 0.32 | 0.02 | 0.03 | 0.02 | 0.01 | 0.36 | 0.02 | 0.02 |
| − | − | − | 0.32 | 0.02 | 0.03 | 0.02 | 0.01 | 0.02 | 0.02 | 0.02 |
| − | + | − | 0.32 | 0.02 | 0.35 | 0.44 | 0.35 | 0.02 | 0.02 | 0.02 |
| + | + | − | 0.32 | 0.42 | 0.32 | 0.44 | 0.32 | 0.02 | 0.02 | 0.02 |
| + | − | − | 0.32 | 0.42 | 0.32 | 0.02 | 0.01 | 0.02 | 0.02 | 0.02 |
| + | − | + | 0.32 | 0.42 | 0.32 | 0.02 | 0.01 | 0.35 | 0.02 | 0.02 |

In this table, under the heading "Input Terminal," the columns of positive and negative signs under the numerals 40, 41 and 42 indicate the existence of the more positive or the more negative value of input signal at the correspondingly numbered input terminal. Thus the first row of plus signs under the headings 40, 41 and 42 indicates the case in which the input signals of terminals 40, 41 and 42 are all at their more positive value of approximately −0.02. The second row under these headings, designated −, +, + indicates the condition in which the signals applied to 41 and 42 are in their more positive condition while that applied to terminal 40 is in the more negative condition. The voltages under the headings $V_{C65}$, $V_{C66}$ and $V_{C67}$ designate the corresponding negative collector voltages of transistors 65, 66 and 67 for the input-voltage condition shown under the heading "Input Terminal" in the same row. Similarly, the headings $V_{B65}$, $V_{B66}$ and $V_{B67}$ indicate the corresponding base voltages of transistors 65, 66 and 67, while the headings $V_{C44}$ and $V_{C45}$ indicate the corresponding collector voltages of transistors 44 and 45 used as a load on transistors 65, 66 and 67.

From Table I it will be seen that the voltage at the collector of transistor 65 remains at −0.32 volt except when all input signals to terminals 40, 41 and 42 have their more positive values, as indicated by the three plus signs in the first row of the table. Under the latter condition, the collector voltage of transistor 65 drops to −0.08 volt, which is sufficiently close to ground to place transistors 44 and 45 in a substantially non-conductive condition as shown in Table I by the rise in their respective collector voltages $V_{C44}$ and $V_{C45}$.

The value of the collector voltage $V_{C65}$ of the upper transistor 65 when transistor 65 is non-conducting depends upon the load connected thereto. Thus, although with the bases of the two transistors 44 and 45 connected as a load, the collector voltage $V_{C65}$ of transistor 65 in its non-conductive state is −0.32 volt, with more bases connected thereto $V_{C65}$ is of lesser magnitude, and with no load connected the corresponding value of $V_{C65}$ is substantially equal to the supply voltage −1.56 volts.

As will be seen from the table, when all three transistors are conducting so as to provide an output signal across load resistor 68, the base voltage of each of the transistors 65, 66 and 67 is actually many times more negative than the collector voltage thereof, but nevertheless the desired large current through the emitter-to-collector paths of transistors 65, 66 and 67 is obtained under these conditions. That this condition of "forward" bias of the collector with respect to the base must take place in this circuit arrangement will be apparent from the following considerations. When all of transistors 65, 66 and 67 are in the conductive condition, the base voltages thereof are of approximately the same magnitude. For conduction to occur in transistor 65, for example, this base voltage must be more negative than the emitter voltage of transistor 65. However, the emitter voltage of transistor 65 is the collector voltage of transistor 66, and the base voltage in the case of transistor 66 is therefore ordinarily substantially negative with respect to the collector thereof. Similarly, since the emitter of transistor 66 is ordinarily positive with respect to the collector thereof, and since the collector of transistor 67 is directly connected to the emitter of transistor 66, the base of transistor 67 is also ordinarily substantially negative with respect to the collector thereof in the conducting condition.

It will be appreciated that, if it were not for the fact that this type of operation is possible with transistors, the collector voltage of transistor 65 would have to be more negative than the base voltages of any of the transistors 65, 66 and 67 in order for them to pass current while they are in their conductive state, and, since the base voltages of these transistors must be negative to render them conductive, the collector voltage of transistor 65 would be limited to a range of values suitable only for maintaining other transistors in their conductive state, unless auxiliary biasing or coupling elements are utilized. Thus if the collector voltage of transistor 65 were limited to values more negative than the base voltages of about −0.4 volt existing when the series chain of transistors 65, 66 and 67 are all conductive, then it would not be possible to utilize the collector voltage of transistor 65 to render non-conductive transistor stages having their bases directly-coupled thereto, such as transistors 44 and 45, and additional circuit elements would be required.

The limitation on the number of transistors such as 65, 66 and 67 which can be arranged with their emitter-to-collector paths in series, in circuits such as those shown in Figure 2 designed to drive directly the bases of transistors operating at the same voltage levels, is therefore in part determined by the consideration that the total voltage from the collector of the uppermost transistor to ground, when all transistors are in their conductive state, should not be so negative as to lie at or beyond the negative base voltage at which the transistor to be rendered non-conductive, such as 44 in Figure 2, begins to conduct heavily. Typically, a transistor driven from the chain of series-arranged transistors will have an emitter-to-base voltage-versus-current characteristic such that, as the base is made slightly negative with respect to emitter, at first only a relatively small current will flow, and it is only when the base voltage has become negative with respect to emitter by more than a threshold voltage $V_T$ that the transistor begins to conduct heavily. The voltage drop across the chain of transistors when conducting should therefore not be substantially more negative than $V_T$ if the transistor driven thereby is to be non-conductive under these conditions.

The number of transistors which can be arranged with their emitter-to-collector paths in series, and still be characterized by a total voltage drop across the chain which is less than the voltage $V_T$ for a given transistor type, may be rather large. For example, with the general arrangement shown in Figure 2, we have found it feasible to obtain reliable and stable operation using five surface-barrier transistors with their emitter-to-collector paths in series, but many more transistors can be arranged in this manner in other applications, depending in part upon the individual characteristics of the transistors employed.

The use of chains of series-connected transistors in the manner described in connection with Figures 1 and 2 is not limited to the particular circuits shown herein, but such aggregates may be combined in other circuit arrangements, and in general each series transistor operates as an electronic switch actuatable by a relatively large range of base voltages of the proper polarity without interfering with the operation of the circuits connected and disconnected thereby.

Figure 3:
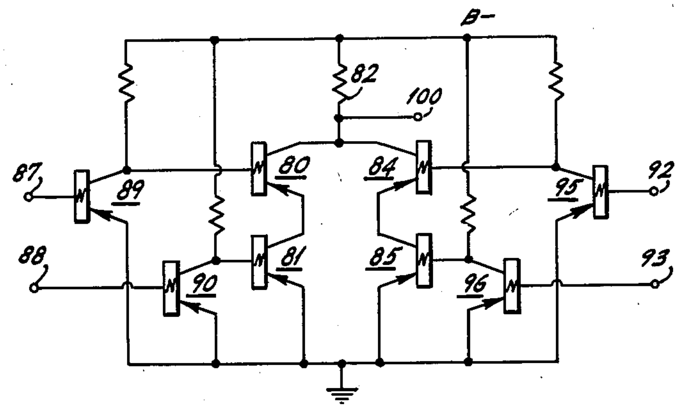
Figure 3 is a schematic diagram of another circuit embodying the invention and particularly useful in computer applications.

For example, as shown in Figure 3 chains of series-connected transistors may themselves be connected in parallel, each transistor to be susceptible of actuation in the manner described above. Thus, in Figure 3 transistors 80 and 81 are shown connected with their emitter-to-collector paths in series with each other and with a load resistor 82. Connected in parallel with transistors 80 and 81 is the series arrangement of transistors 84 and 85, which are also in series with the load resistor 82. Transistors 80 and 81 are actuatable between their conductive and non-conductive states by means of voltages supplied to the bases thereof from input terminals 87 and 88 by way of actuating transistors 89 and 90 respectively, while transistors 84 and 85 may be switched between their corresponding states of conduction and non-conduction by means of actuating signals applied to terminals 92 and 93 and supplied to the bases of transistors 84 and 85 by way of transistors 95 and 96. The manner of actuating the transistors 80, 81, 84 and 85 is generally similar to that employed in the arrangement of Figure 2 and described in detail hereinbefore.

If both transistors 80 and 81 are in their conductive condition, an output signal representing a deviation from the supply potential B− is produced at output terminal 100; similarly, if both transistors 84 and 85 are rendered conductive, an output signal appears at terminal 100. If all four transistors are rendered conductive, an output signal is also produced at the output terminal. However, if one of the transistors 80 and 81, and one of transistors 84 and 85, is non-conductive, then the output potential at terminal 100 remains substantially equal to B−. The function of this circuit as shown may then be described as providing an output signal at terminal 100 either when both transistors 80 and 81 are actuated, or when both transistors 84 and 85 are rendered conductive by the application of suitable base voltages. Such circuits are of utility in switching applications generally and in digital computers in particular.

Figure 4:
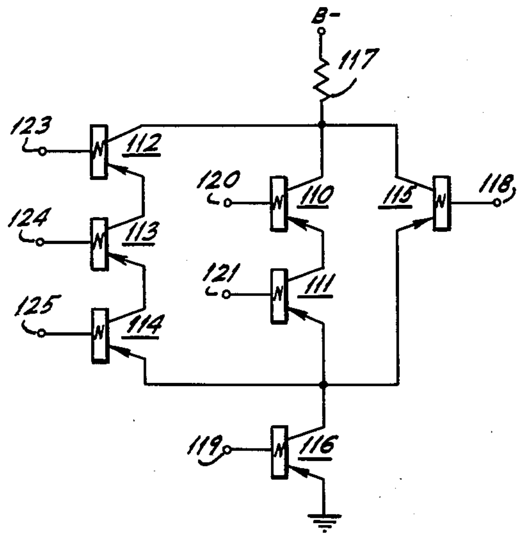
Figures 4, 5 and 6 are schematic diagrams illustrating other forms and applications of the invention.

Figure 4 indicates another type of possible disposition of transistors utilizing the above-described connection, in which different numbers of series-connected transistors are connected in a series-parallel arrangement. Thus transistors 110 and 111 are connected in series with each other between B⁻ and ground. In parallel with this series-pair is the series combination of transistors 112, 113 and 114. Further, in parallel with both of these series chains of transistors is a single transistor 115, and in series with the parallel combination of all three chains is a single transistor 116 and a load resistor 117. Current is then produced through load resistor 117, when, and only when, transistors 115 and 116 are actuated by signals applied to base terminals 118 and 119 thereof, or when transistors 110, 111 and 116 are actuated by signals applied to base terminals 120, 121 and 119, or when transistors 112, 113, 114 and 116 are actuated by means of appropriate signals applied to the base terminals 123, 124, 125 and 119 thereof, respectively.

Figure 5:
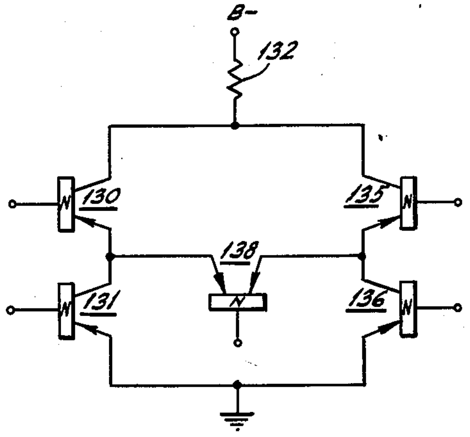

Not only may the circuits described above be utilized in series, parallel and series-parallel arrangements, but cross-connections may be employed as in the circuit shown in Figure 5. In this figure, transistors 130 and 131 are connected with their emitter-to-collector current paths in series with load resistor 132, between ground and a source of potential B⁻. Transistors 135 and 136 are also arranged in series with each other and resistor 132, and with their series current-path in parallel with that of transistors 130 and 131. In addition, transistor 138 provides a current path by way of its emitter and collector from the interconnection between transistors 130 and 131 and the interconnection between transistors 135 and 136, as shown. Each of the transistors 130, 131, 135, 136 and 138 may be rendered conductive by suitable signals applied to the base terminals thereof. In some applications transistor 138 is preferably of the symmetrical type, permitting current to flow in either direction between its "emitter" and "collector" when the base is biased in the forward direction with respect to the "emitter." In general, however, any transistor having a satisfactorily high value of reverse alpha may be used for this purpose.

In this circuit, substantial currents are produced in load resistor 132 when, and only when, at least one of the following combinations of transistors is actuated: 130 and 131; 135 and 136; 131, 138 and 135; 136, 138 and 130. Such a function is of general utility in switching and computer applications, and is particularly convenient because of the relatively small number of transistors required to provide the operation described.

Many more complex embodiments and uses of the invention are also possible. Thus, in Figure 6 there is shown a symmetric circuit having the following properties: at one output terminal there is produced a signal only when all of the three binary signal sources are switched from a reference condition to an alternate condition; an output signal is provided at another terminal when, and only when, any two of the binary signals sources are switched to the alternate condition; a signal is produced at a third output terminal when, and only when, any one of the three binary signal sources is actuated to its alternate condition; and a signal is produced at a fourth output terminal only when none of the binary signal sources is actuated.

Figure 6:
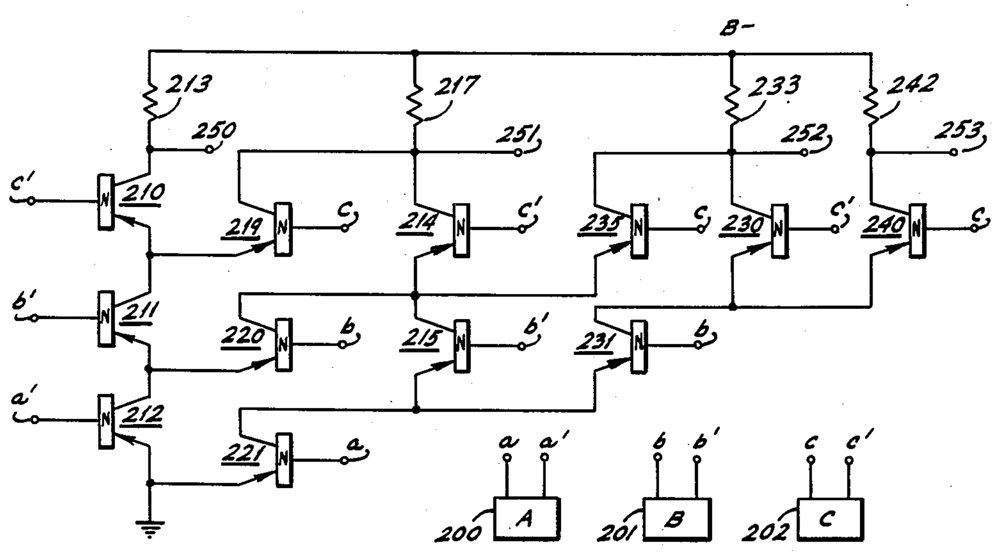

To facilitate the description of Figure 6, it will be assumed that blocks 200, 201 and 202 each represent a source of two signals, one of higher voltage level than the other, and each is characterized in that it may be actuated in such manner as to interchange the signals at the two output terminals thereof. Thus, element 200 may typically comprise a multivibrator having two stable conditions; in the "reference" condition depicted in Figure 6, one output terminal *a* of the multivibrator is at a relatively positive voltage $a_0$ suitable for rendering non-conductive transistors to whose base the terminal is connected, while the other output terminal *a'* is at a relatively negative voltage $a_1$, which is suitable for rendering conductive transistors to whose base this terminal is connected. The multivibrator may, however, be actuated to its alternate condition in which the terminal *a* formerly providing the signal $a_0$ now provides the signal $a_1$, and vice versa for the other terminal. Similarly, element 201 may represent another multivibrator having voltages $b_0$, $b_1$ at its two output terminals *b*, *b'* in its reference condition, and the reverse voltages $b_1$, $b_0$ when actuated to its alternate condition. In the case of element 202, the output terminals *c*, *c'* thereof will in their reference condition possess the voltage levels $c_0$, $c_1$, and the opposite levels $c_1$, $c_0$ when actuated to the alternate condition.

The circuit for accomplishing the desired function comprises first the series chain of transistors 210, 211 and 212 having their emitter-to-collector current paths in series with each other and with load resistor 213, and connected between ground and the source of negative potential B⁻ as shown. A second chain of transistors is also employed, comprising transistors 214 and 215 which have their emitter-to-collector paths in series, the collector of transistor 214 being connected to the source of negative potential B⁻ through a load resistor 217. The emitter-to-collector current path of transistor 219 is connected between the emitter of transistor 210 and the collector of transistor 214, the emitter-to-collector path of transistor 220 is connected between the collector of transistor 212 and the emitter of transistor 214, and the emitter-to-collector path of transistor 221 is connected between ground and the emitter of transistor 215.

In addition, there are employed transistors 230 and 231 having their emitter-to-collector current paths in series, the collector of transistor 230 being connected to the source of negative potential B⁻ by way of load resistor 233. The emitter of transistor 231 is directly connected to the emitter of transistor 215, while the collector of transistor 230 is connected, by way of the emitter-to-collector current path of a transistor 235, to the collector of transistor 215. Finally, a transistor 240 is provided with its emitter directly connected to that of transistor 230 and its collector supplied with negative potential from the source B⁻ by way of load resistor 242.

Each base element of the transistors in Figure 6 is connected to the terminal of sources 200, 201 and 202 indicated by the associated letter. For example, the base element of transistor 212 is connected to the output terminal marked *a'* of element 200, the base element of transistor 221 is connected to the terminal *a* of element 200, while the base of transistor 211 is connected to the element *b'* of source 201, and similarly for the other base elements; the corresponding interconnections have been omitted in the interest of clarity.

In the operation of the arrangement of Figure 6, in the reference condition of sources 200, 201 and 202 those base terminals having primed letter designations are rendered conductive by the relatively negative voltages supplied thereto, while those designated by unprimed letters are rendered non-conductive by the relatively positive voltages applied thereto. To produce an output signal at any one of output terminals 250, 251, 252 or 253, a conductive current path must be established from B⁻ to ground by way of the emitter-to-collector paths of a number of the transistors shown. In the reference condition, the only such path is by way of transistors 210, 211, 212 and resistor 213, and hence in the reference condition in which none of the sources 200, 201 or 202 is actuated, an output signal appears only at output terminal 250.

When source 200 only is actuated to its alternate condition all base elements in Figure 6 marked *a* or *a'* are changed to the opposite voltage condition. In this changed situation the only conductive path between B− and ground is by way of transistors 221, 215, 214 and resistor 217, producing an output signal at output terminal 251. Similarly, if only source 201 is actuated to its alternate condition, the only conductive current path is by way of transistors 212, 220, 214 and resistor 217, also producing an output signal only at output terminal 251; if only source 202 is actuated to its alternate condition, the only conductive current path is by way of transistor 212, 211, 219 and resistor 217, again producing an output signal only at output terminal 251.

When both sources 200 and 201 are actuated, the only conductive path is by way of transistors 221, 231, 230 and resistor 233, and an output signal is produced only at output terminal 252. If both 201 and 202 are actuated, and 200 is not, the only conductive path is by way of transistors 212, 220, 235 and load resistor 233, and again an output signal is produced only at terminal 252. In the third combination when only sources 200 and 202 are actuated, the corresponding sole conductive path is by way of transistors 221, 215, 235 and resistor 233 with resultant output voltage at terminal 252.

Finally, if all three of the sources 200, 201 and 202 are actuated, the only conductive path from B− to ground is by way of transistors 221, 231 and 240, and thence through load resistor 242 to B−, and an output signal is produced only at output terminal 253.

The circuit of Figure 6 is therefore seen to fulfill the requirements that, when all three of the binary sources are operated, output signal appears only at terminal 253; when any two, and only two, are operated, output signal is produced at terminal 252 alone; when any one, and only one, of the sources is operated, output signal is produced only at terminal 251; and when none of the sources is operated, output is produced only at terminal 250. As will be apparent to one skilled in the art, many other symmetric circuits, including the shifted-down type, for performing other logical functions may be produced by extension of the techniques exemplified in Figure 6.

Although the invention has been described herein with particular reference to specific embodiments thereof, it will be understood that it is susceptible of embodiment in a wide variety of other forms without departing from the scope of the invention. For example, it has been found that the transistors employed need not be of the type having N-type base material, but may be of the opposite conductivity-type in which the base material is P-type, with appropriate reversal of the polarity of the applied potentials and resultant currents in a manner which will be apparent to one skilled in the art. Furthermore, the load means for detecting the passage of current through the series paths in the transistors need not comprise a resistor connected to the collector of the uppermost transistor, but may be any of several other current-responsive devices located at any one of several points in the series chain, so long as care is taken to prevent the occurrence of large currents therein upon the actuation of less than all of the transistors. For example, it may be located in series between two of the transistors, and may in some instances and for some purposes comprise an inductance through which a surge of current will flow when the series chain is first actuated. Other load elements, linear or nonlinear, may also be connected in the series current path; for example, a diode may be included in certain cases where necessary to prevent "sneak paths" in logic circuits. Furthermore, it is not necessary in all cases to actuate the transistors from the substantially cut off condition to the wholly saturated condition, since gating or modulating effects may be obtained by lesser variations in the degree of conduction. For example, it is contemplated that the circuit of Figure 1 involving the series arrangement of transistors may also be used as a modulator by varying the base voltages of one or more of the two transistors within the range between saturation and cut off. It may of course be used for gating purposes generally, by applying the signal to be gated to the base of one of the transistors and the gating signal to the bases of all transistors to be rendered conductive.

We claim:

1. A gate circuit comprising at least a first transistor and a second transistor of the same conductivity-type as said first transistor, each of said transistors having at least emitter, collector and base electrodes, means for interconnecting said transistors to provide a series current path through said emitter and collector electrodes thereof, means for applying a potential difference between opposite ends of said series current path, means for intermittently applying to said base electrode of said first transistor a potential of the same polarity, and at least as great as, the contemporaneous potential of said collector electrode of said first transistor with respect to said emitter electrode thereof, and means for applying to said base electrode of said second transistor a potential with respect to that of said emitter electrode of said first transistor which is of the same polarity as said potential of said base electrode of said first transistor and at least as great as said potential of said base electrode of said first transistor but less than twice said last-named potential.

2. A signal-translating circuit comprising at least a first transistor and a second transistor of the same conductivity-type, each having at least emitter, collector and base elements, a voltage source having a first terminal at a reference potential and a second terminal at another potential, means connecting the emitter-to-collector current paths of said transistors in series between said first and second terminals, a third and a fourth transistor, each having at least emitter, collector and base elements and of the same conductivity-type as said first and second transistors, load means connected to the collector elements of each of said third and fourth transistors, and direct connections from said collector elements of said third and fourth transistors to said base elements of said first and second transistors, respectively.

3. The circuit of claim 2, in which said third and fourth transistors are each connected in series with their respective load means between said first and second terminals.

4. The circuit of claim 2, comprising, in addition, load means in series with said emitter-to-collector paths of said first and second transistors, a fifth transistor to be controlled by variations in the current through said first and second transistors, and a direct connection from said load means to said base element of said fifth transistor.

5. A signal translating circuit comprising a source of supply voltage having a first terminal at a reference potential and a second terminal at a supply potential differing from said reference potential, a plurality of transistors of the same conductivity-type, each having at least emitter, collector and base elements and having their emitter-to-collector paths connected in series to form a series chain between said first and second terminals in the polarity to urge minority-carriers from said emitter elements to said collector elements of each of said transistors, at least one actuating transistor and a load impedance therefor, said actuating transistor and said load impedance being connected in series between said first and second terminals with the polarity to urge minority-carriers from said emitter to said collector of said actuating transistor, a direct connection from said collector element of said actuating transistor to the base element of one of said plurality of transistors, a driven transistor to be controlled by current through said plurality of transistors, said driven transistor having at least emitter, collector and base elements and having its emitter-to-collector path in series between said first and second terminals in a polarity to urge minority-carriers from said emitter to said collector thereof, and a direct connection from the collector element of one of said plurality of transistors to said base element of said driven transistor.

6. The circuit of claim 5, in which the number of said actuating transistors is equal to the number of said plurality of series-connected transistors, and in which the collector element of each of said actuating transistors is directly connected to the base element of a different one of said plurality of transistors.

7. A transistor circuit comprising a first transistor device having at least emitter, collector and base elements, a second transistor device also having at least emitter, collector and base elements, said first and said second transistor devices being of the same conductivity-type so that said emitter elements thereof are minority-carriers emissive when said transistor devices are supplied at their respective base elements with potentials of a predetermined polarity with respect to the potentials of their respective emitter elements, means directly connecting said collector element of said first transistor device to said emitter element of said second transistor device whereby the emitter-collector current paths of said transistor devices are connected directly in series, a resistive impedance element directly connected in series with said emitter-collector current paths of said transistor devices, means for applying across said series combination of said emitter-collector current paths and said impedance element a voltage of a polarity to bias said collector elements of said first and said second transistor devices in said predetermined polarity with respect to their respective associated emitter elements, means for applying to said base element of said first transistor device a potential with respect to that of said emitter element thereof which varies between first and second values, said first value being of said predetermined polarity with respect to the potential of said emitter element of said first transistor device and greater in magnitude than the contemporaneous potential at said collector element of said first transistor device, said second value of potential being less in magnitude than said contemporaneous potential at said collector element of said first transistor device, and means for applying to said base element of said second transistor device a potential with respect to said emitter element of said first transistor device which varies between substantially said first and second values.

8. A transistor AND circuit comprising a first N-type transistor having first emitter, collector and base electrodes, a second N-type transistor having second emitter, collector and base elements, means directly connecting said first collector electrode to said second emitter electrode, current supply means having a first terminal at a reference potential and a second terminal at a supply potential negative with respect to said reference potential, a resistive impedance element having two terminals one of which is directly connected to said second collector electrode, means connecting said first terminal of said supply means to said first emitter electrode and said second terminal of said supply means to the other of said two terminals of said resistive impedance element, means supplying said first base electrode intermittently with a potential negative with respect to said reference potential by an amount at least as great as the contemporaneous collector-to-emitter voltage of said first transistor, and means for supplying said second base electrode intermittently with a potential substantially equal to said potential intermittently supplied to said first base electrode.

9. The circuit of claim 4, comprising also means for biasing the emitter element of said fifth transistor at substantially said reference potential.

10. A transistor circuit comprising: a first plurality of transistors of the same conductivity type each having emitter, collector and base electrodes; a source of reference potential and a source of collector supply potential for said transistors; a first resistive element; means connecting the emitter-to-collector current paths of said plurality of transistors and said first resistive element in series with each other between said source of reference potential and said source of collector supply potential, said first resistive element having one of its terminals connected directly to the collector electrode of one of said transistors and its other terminal connected to said source of collector supply potential and each other of said transistors having its collector electrode connected directly to the emitter electrode of one of said transistors, the emitter electrode of one of said transistors being connected directly to said source of reference potential, whereby strong conduction can occur through the series combination of said first resistive element and said plurality of transistors only when each of said plurality of transistors is in its conductive condition; a second plurality of transistors of the same conductivity-type as said first plurality of transistors, and each having emitter, collector and base electrodes; means for supplying each of said second plurality of transistors with an emitter potential substantially equal to said reference potential; a separate resistive element for each of said second plurality of transistors connected directly between the collector electrode thereof and said source of collector supply potential; and means directly connecting the collector electrodes of said second plurality of transistors to the base electrodes of different ones of said first plurality of transistors to produce strong conduction through said series combination only when each of said second plurality of transistors is substantially non-conductive.

11. A circuit in accordance with claim 10, comprising a further transistor also having emitter, collector and base electrodes and of the same conductivity type as said first plurality of transistors, means supplying said emitter electrode of said further transistor with a potential substantially equal to said reference potential, means supplying said further transistor with collector operating potential, and means directly connecting said one terminal of said first resistive element to said base electrode of said further transistor to render said further transistor strongly conductive when any of said second plurality of transistors is strongly conductive and to render said further transistor substantially non-conductive when each of said second plurality of transistors is substantially non-conductive.

12. A circuit in accordance with claim 11, in which said first plurality of transistors is equal in number to said second plurality of transistors.

References Cited in the file of this patent

UNITED STATES PATENTS

| | | |
|---|---|---|
| 2,569,347 | Shockley | Sept. 25, 1951 |
| 2,591,961 | Moore | Apr. 8, 1952 |
| 2,622,213 | Harris | Dec. 16, 1952 |
| 2,627,039 | MacWilliams | Jan. 27, 1953 |
| 2,666,818 | Shockley | Jan. 19, 1954 |
| 2,730,576 | Caruthers | Jan. 10, 1956 |
| 2,831,126 | Linvill et al. | Apr. 15, 1958 |

OTHER REFERENCES

Publication: "Electronics," August 1953, pp. 170–173.

Publication: "Electronics," September 1953, pp. 140–143.

"The Development of a High-Speed Triode-Tree Electronics Commutator," by Paul W. Cooper, Massachusetts Institute of Technology (submitted in partial fulfillment of the requirements for the degree of Master of Science at M.I.T. on Aug. 31, 1951).

"Some Circuit Aspects of the Transistor," by Ryder et al., published in the Transistor, prepared by Bell Telephone Laboratories, Inc., for Western Electric Co., Inc. (1951), pages 165–200.